US005780978A

United States Patent [19]
Bang

[11] Patent Number: 5,780,978
[45] Date of Patent: Jul. 14, 1998

[54] VERTICAL FOCUSING CIRCUIT

[75] Inventor: Jeong-Ho Bang, Suwon, Rep. of Korea

[73] Assignee: SamSung Electronics Co., Ltd., Suwon, Rep. of Korea

[21] Appl. No.: 642,683

[22] Filed: May 3, 1996

[30] Foreign Application Priority Data

May 3, 1995 [KR] Rep. of Korea .................. 10811/1995

[51] Int. Cl.$^6$ ............................................. H01J 29/58
[52] U.S. Cl. ................................. 315/382.1; 348/806
[58] Field of Search ............................ 315/382, 382.1; 348/326, 806

[56] References Cited

U.S. PATENT DOCUMENTS 5,430,358  7/1995  George .................................. 315/382
5,534,757  7/1996  Takatori .............................. 315/382

Primary Examiner—Theodore M. Blum
Attorney, Agent, or Firm—Robert E. Bushnell, Esq.

[57] ABSTRACT

A vertical focusing circuit is disclosed wherein a constant gain control of a vertical focusing signal is enabled to obtain an optimal dynamic focusing control without subjecting to a variance of vertical frequency. The circuit for generating a vertical focusing circuit so as to form a dynamic focusing signal and to supply the signal to a flyback transformer, comprises a microcomputer for generating a predetermined voltage level of a direct current corresponding to a vertical frequency; a parabolic waveform signal generator for generating a parabolic waveform using the voltage level and a cycle of a vertical blanking signal; a buffer means for improving a distortion caused by an impedance unbalance of the parabolic waveform signal output from the parabolic waveform signal generator; and an amplifier for amplifying a signal output of a parabolic waveform generated from the buffer to a predetermined voltage level. As a result, a vertical focusing signal voltage gain is obtained at a constant value without subjecting to a variance of a vertical frequency currently being employed, thereby enabling a multimode monitor to maintain a dynamic focusing operational mode. In addition, a user-controlled mode of a vertical focusing gain control is able to be adapted to a preferred embodiment of the instant invention.

20 Claims, 4 Drawing Sheets 5,780,978

1

VERTICAL FOCUSING CIRCUIT

CROSS-REFERENCE TO RELATED TO APPLICATION

This application makes reference to, incorporates the same herein, and claims all benefits accruing under 35 U.S.C. §119 from an application for Vertical Focus Circuit earlier filed in the Korean Industrial Property Office on the 3rd of May 1995 and there duly assigned Ser. No. 10811/1995 by that office.

BACKGROUND OF THE INVENTION

The present invention relates to a focusing circuit in a cathode-ray tube, and (CRT) more particularly, to a vertical focusing circuit for enabling optical dynamic focusing control by providing a constant vertical focusing gain at any range of vertical frequency level.

SUMMARY OF THE INVENTION

It is therefore an object of the present invention to provide an improved vertical focusing circuit and process.

It is another object to provide a vertical focusing circuit for enabling an optical dynamic focusing control in a cathode-ray tube (CRT) by providing a constant vertical focusing gain at any range of vertical frequency level.

It is another object to provide a vertical focusing circuit in which a vertical focusing gain is adjustable by a user.

To achieve these and other objects, there is provided a vertical focusing circuit for generating a vertical focusing signal that is mixed with a horizontal focusing signal applied from a horizontal focusing circuit so as to generate a dynamic focusing signal. A microcomputer supplies direct current of a predetermined voltage level corresponding to a vertical frequency. A parabolic waveform signal generator generates a parabolic waveform signal using the direct current of the predetermined voltage level applied from the microcomputer and a period of a vertical blanking signal. A buffer improves a distortion caused by impedance unbalance of a parabolic waveform signal generated from the parabolic waveform signal generator; and an amplifier amplifies an input parabolic waveform signal from the buffer to a predetermined voltage level.

BRIEF DESCRIPTION OF THE DRAWINGS

A more complete application of the invention, and many of the attendant advantages thereof, will be apparent as the same becomes better understood by reference to the following detailed description when considered in conjunction with the accompanying drawings in which like reference numerals and symbols indicate the same or similar components, wherein.

2

DETAILED DESCRIPTION OF THE PREFERRED EMBODIMENT

Turning now to the drawings and referring to FIG. 1, a detailed explanation for the conventionally employed vertical focusing circuit will be given hereunder. As shown, a vertical focusing circuit 10 generates a vertical focusing signal and a flyback transformer FBT 30 receives a mixed input signal of horizontal and vertical focusing signals at its focus pack terminal.

Figure 1:
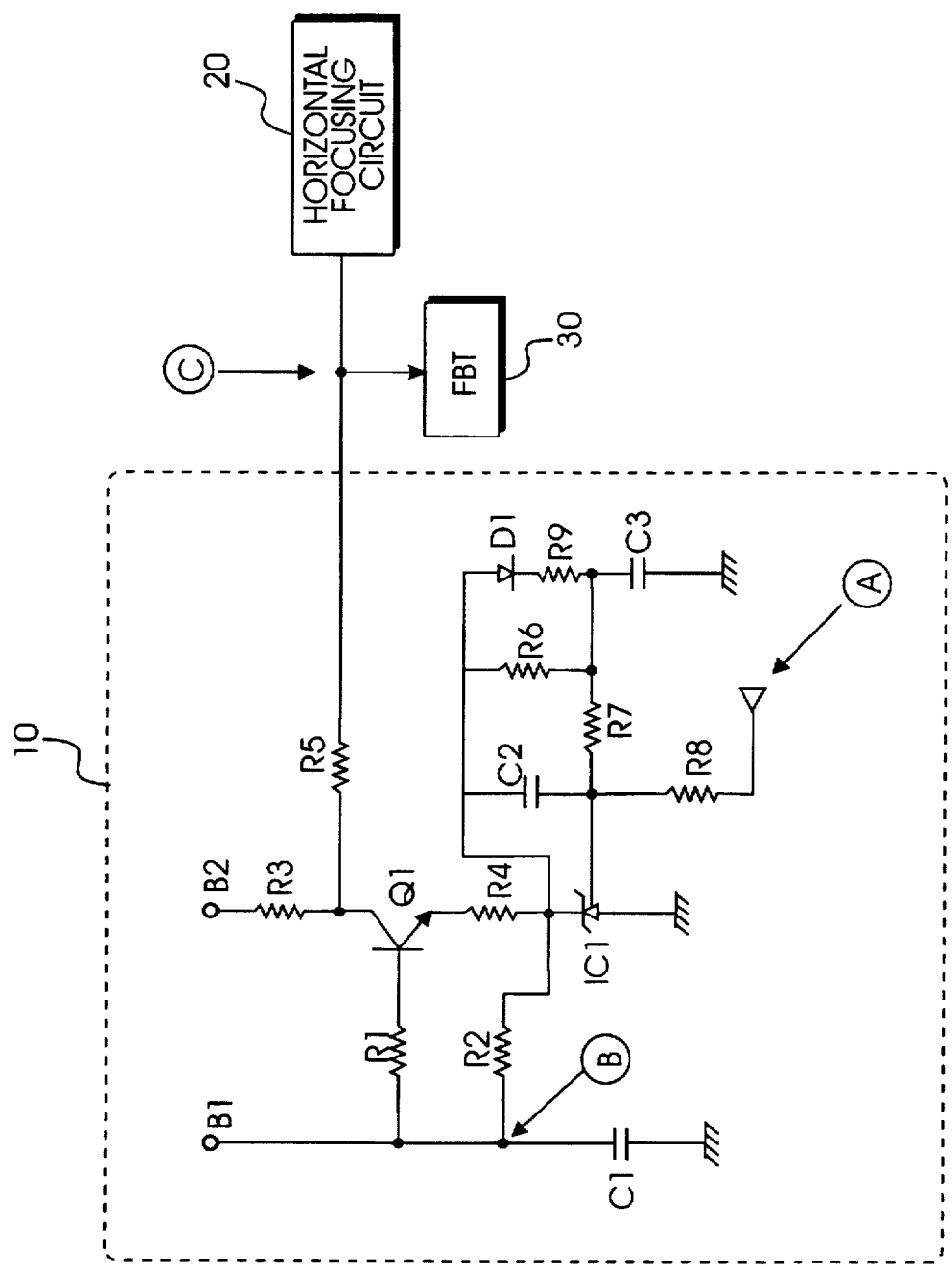
FIG. 1 is a schematic circuit diagram illustrating an abstract representation of the salient features of a hypothetical reconstruction of a vertical focusing circuit.
Figure 2:
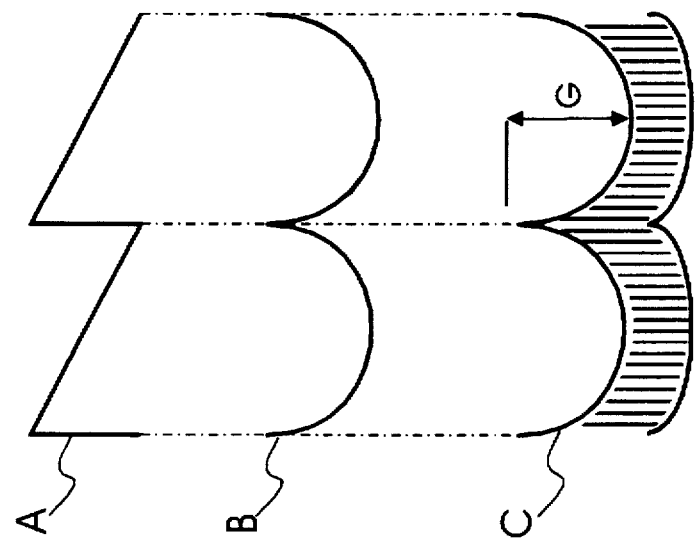
FIG. 2 is a two coordinate graph showing respective waveforms taken at the nodes indicated by corresponding alphabetic symbols in the circuit of FIG. 1.

Turning to the vertical focusing circuit 10 as shown in FIG. 1, a vertical ramp waveform signal as shown in A of FIG. 2 is applied to an input terminal of resistor R8. The vertical ramp waveform signal input is converted to a parabolic waveform signal as shown in B of FIG. 2 via a regular IC1, and is fed to a junction node as indicated by B. The parabolic waveform signal at node B is then amplified by an amplifying transistor Q1. An amplified signal at the junction node of resistor R3 and the collector terminal of transistor Q1 is fed to a junction node connected to an output terminal of horizontal focusing circuit 20 via resistor R5. The amplified signal is mixed with a horizontal focusing signal from horizontal focusing circuit 20 at the junction node as indicated by C in FIG. 1. A mixed signal which is a dynamic focusing signal as shown in C of FIG. 2, is then fed to flyback transformer FBT 30. In the above conventional construction, however, a vertical focusing gain G varies according to frequency variation since each component employed in vertical focusing circuit 10 has its independently innate fixed value. In the instance of 60 Hertz of vertical frequency, for example, a gain of approximately 150 Volts is generated. If a vertical frequency is 75 Hertz, a gain of approximately 200 Volts is generated. Also, if a vertical frequency is 120 Hertz, a gain of approximately 300 Volts is generated. The above variance of voltage gain causes a fatal problem to a multimode monitor in which a constant focusing voltage gain G is required so as to realize an ideal dynamic focusing control without relation to any vertical frequency band employed.

Figure 3:
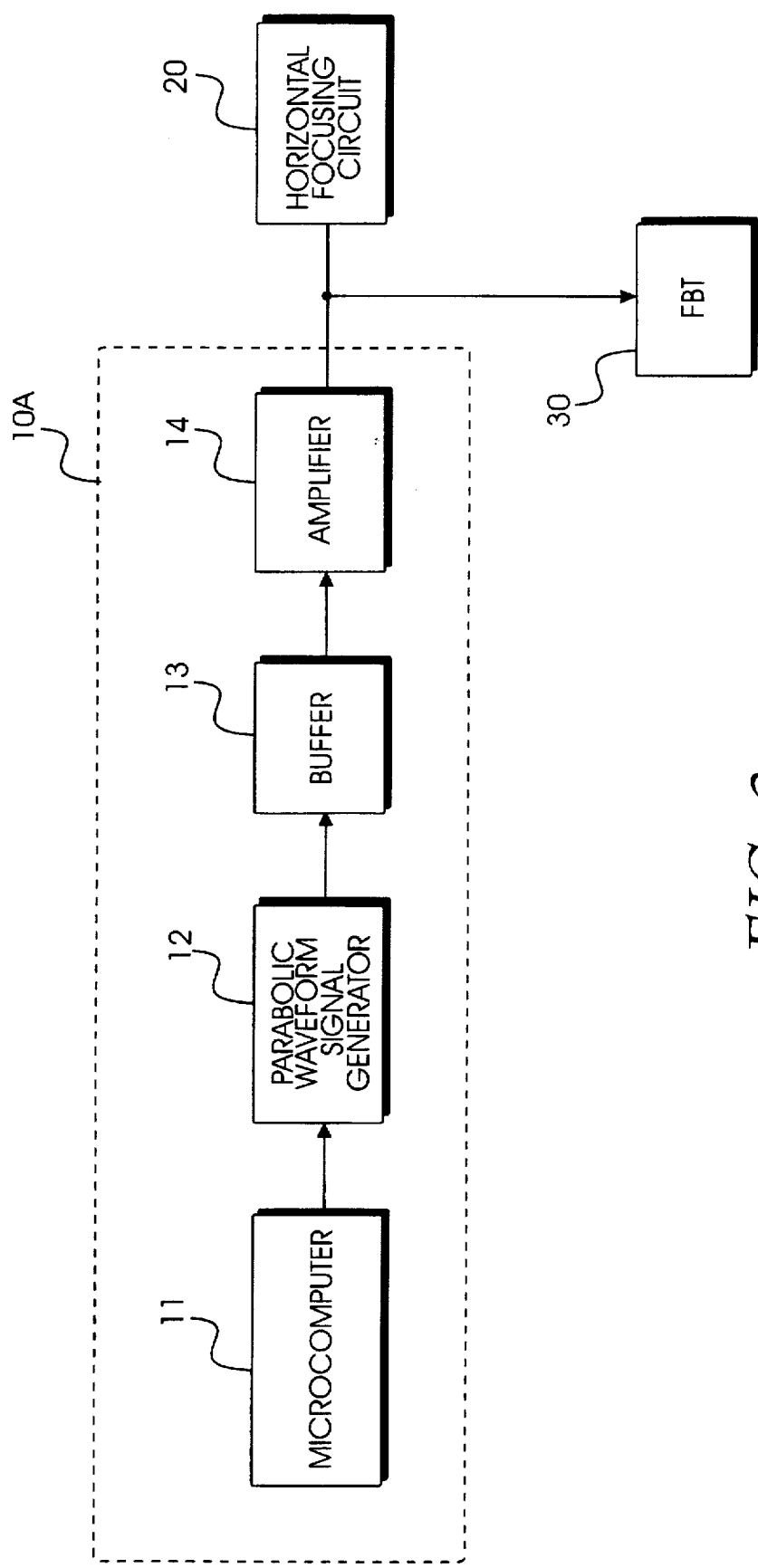
FIG. 3 is a schematic block diagram of one preferred embodiment of a vertical focusing circuit constructed according to the principles of the present invention.
Figure 4:
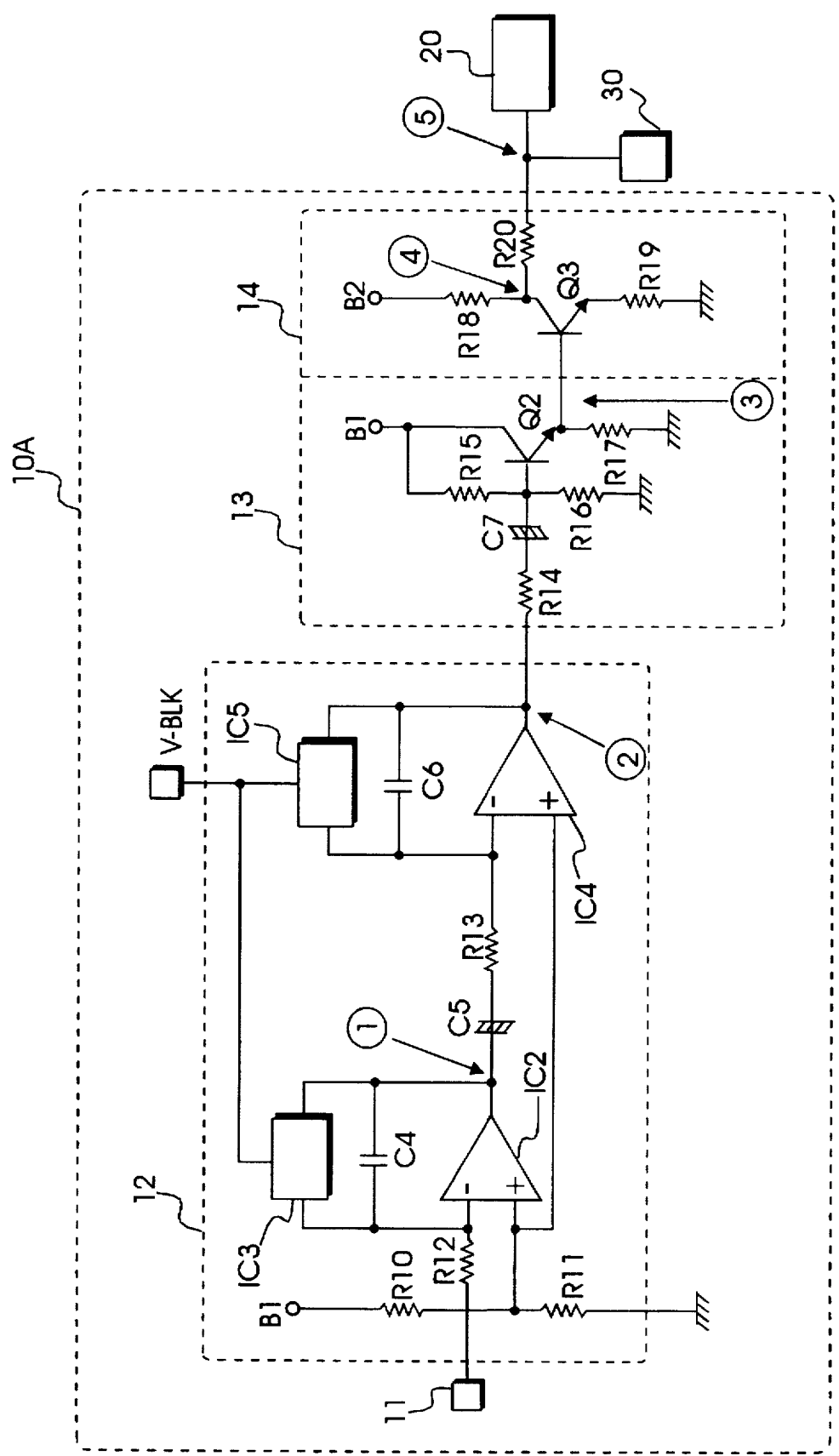
FIG. 4 is a detailed circuit diagram of one implementation for the one preferred embodiment of the circuit shown in FIG. 3.

Referring now to FIG. 3, a schematic block diagram illustrates one preferred embodiment constructed according to the principles of the present invention. A vertical focusing circuit 10A generates a vertical focusing signal which is mixed with a horizontal focusing signal output from horizontal focusing circuit 20 to thereby apply a dynamic focusing signal to flyback transformer 30. The vertical focusing circuit 10A may be constructed using a microcomputer 11 for generating a predetermined voltage level of direct current corresponding to a vertical frequency level employed, a parabolic waveform signal generator 12 for generating a parabolic waveform signal by using a period of a vertical blanking signal and the direct current voltage output from microcomputer 11, a buffer 13 for improving a distortion caused by an impedance unbalance the of parabolic waveform signal output from parabolic waveform signal generator 12, and an amplifier 14 for amplifying a parabolic waveform signal output from buffer 13 to a predetermined voltage level to output an amplified signal to a flyback transformer FBT 30. A detailed circuit configuration of one preferred embodiment of a vertical focusing circuit 10A from FIG. 3 is illustrated in FIG. 4. An output signal of microcomputer 11 is applied to an inverting terminal of oscillator IC2 via resistor R12 of parabolic waveform generator 12. A reference voltage supplied from a power source B1 and voltage-divided by a pair of resistors, R10 and R11, serially connected to a local reference potential such as ground, is coupled to non-inverting terminal of oscillator IC2. A capacitor C4 and a switching element IC3 connected in parallel are commonly coupled to an inverting terminal and an output terminal of oscillator IC2. An output terminal of oscillator IC2 is connected to an inverting terminal of an oscillator IC4 via serially connected capacitor C5 and resistor R13. A reference voltage supplied from a power source B1 and voltage-divided by serially connected resistors, R10 and R11, is also applied to a non-inverting terminal of oscillator IC4. Both junction node of a capacitor C6 and a switching element IC5 are connected to an inverting terminal and an output terminal of oscillator IC4. A vertical blanking signal V-BLK is commonly applied to the switching elements IC3 and IC5. An output terminal of oscillator IC4 of parabolic waveform generator 12 is connected to a base electrode of transistor Q2 of buffer 13 via serially connected resistor R14 and capacitor C7. An emitter electrode is grounded via a resistor R17. A pair of bias resistors R15 and R16, connected in series, are connected between a power source B1 and the ground potential. The junction node of bias resistors R15 and R16 is coupled to a base electrode of transistor Q2. An output from an emitter electrode of transistor Q2 is connected to a base electrode of transistor Q3 in amplifier 14. An emitter electrode of transistor Q3 is coupled to the ground potential via resistor R19. A power supply B2 is connected to a collector electrode of transistor Q3 via resistor R18. A vertical focusing signal is generated at the junction node of resistor 18 and a collector electrode of transistor Q3. The vertical focusing signal at node 4 is applied to a junction node 5 of horizontal focusing circuit and flyback transformer 30 via resistor R20.

As a result, the vertical focusing signal output from amplifier 14 is mixed with a horizontal focusing signal output from horizontal focusing circuit 20 at the junction node 5. A mixed signal at the node 5 is then applied to flyback transformer 30. A pair of resistors R15 and R16, connected in series, are bias resistors for transistors for transistor Q2. Resistors R18 and R19 are bias resistors for transistor Q3 whose values determine the maximum value of a vertical focusing gain. Consequently, a gain control of vertical focusing circuit 10A can be achieved by adjusting the values of both resistors R18 and R19.

Figure 5:
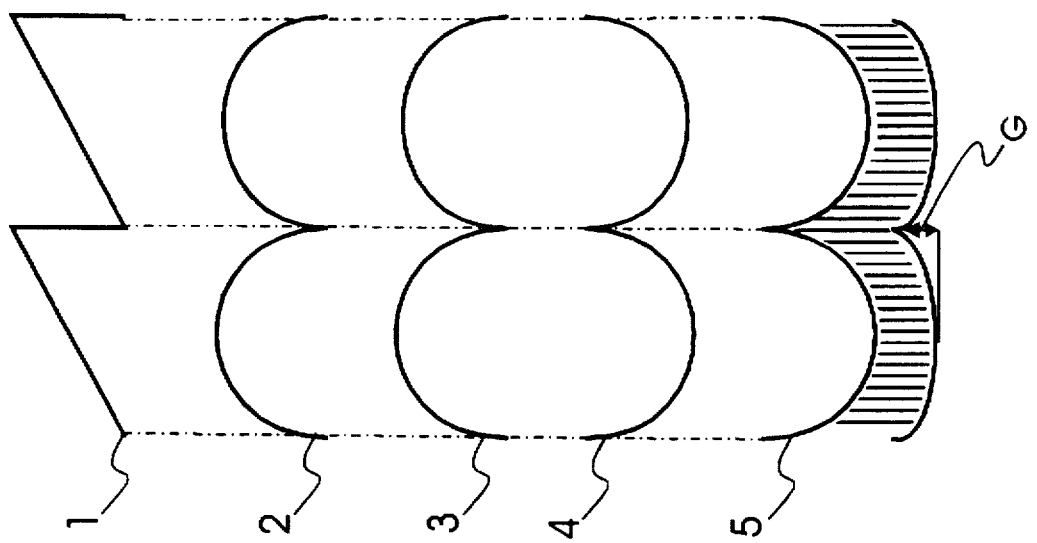
FIG. 5 is a two coordinate graph illustrating respective waveforms taken at the corresponding nodes indicated by the corresponding reference numerals shown in FIG. 4.

FIG. 5 illustrates various types of waveforms applied at respective nodes designated by same reference numerals as are used in FIG. 4. Referring now to FIGS. 4 and 5, the vertical focusing circuit constructed according to the principles of the present invention will be explained in detail hereinbelow. Microcomputer 11 in vertical focusing circuit 10A generates a predetermined voltage level of direct current according to a vertical frequency to an inverting terminal of oscillator IC2 via resistor R12 in parabolic waveform signal generator 12. The voltage level of direct current supplied from microcomputer 11 is compared with the level of reference voltage applied to a non-inverting terminal of oscillator IC2. Capacitor C4 and resistor R12 serve as time constant elements. By virtue of an operation of a combination of time constant elements, oscillator IC2 generates a ramp waveform signal as illustrated by reference numeral 1 in FIG. 5 to an input terminal of capacitor C5. Here, a ramp waveform gain control is achieved by controlling the voltage level of a direct current output from microcomputer 11. Accordingly, a gain control for a vertical focusing signal is thereby accomplished.

The ramp waveform signal at an output terminal of oscillator IC2 is supplied to an inverting terminal of oscillator IC4 via serially connected AC coupling capacitor C5 and resistor R13 employed for improving distortion the voltage level of a ramp waveform signal input at an inverting terminal of oscillator IC4 is compared with a reference voltage level applied to an non-inverting terminal thereof. Upon comparison of voltage levels as explained, after oscillator IC4 outputs a parabolic waveform signal as illustrated by reference numeral 2 in FIG. 5.

A parabolic waveform signal is generated periodically in synchronization with a vertical blanking signal V-BLK input via a couple of switching elements IC3 and IC5 from an output terminal of oscillator IC4. The parabolic waveform signal output from oscillator IC4 is fed to a base electrode of transistor Q2 via serially connected AC coupling capacitor C7 and resistor R14 of buffer 13. A transistor Q2 is connected as an emitter follower type, to prevent distortion of a parabolic waveform caused by an impedance unbalance when the waveform is applied to a base electrode of transistor Q3 in amplifier 14.

A signal output from an emitter electrode of transistor Q2, as illustrated by waveform 3 in FIG. 5, is fed to a base electrode of transistor Q3 in amplifier 14. As illustrated by waveform 4 in FIG. 5, a parabolic waveform signal as amplified by an operation of transistor Q3 as required by a cathode-ray tube CRT (not shown), is generated from a junction node of a collector electrode of transistor Q3 and resistor 18. A parabolic waveform signal generated from a collector electrode is applied to the junction node of horizontal focusing circuit 20 and flyback transformer 30 via resistor R20. The parabolic waveform supplied at the node indicated by reference numeral 5 is mixed with an output signal of horizontal focusing circuit 20, thereby forming a mixed signal which is a dynamic focusing waveform as illustrated by 5 in FIG. 5. The dynamic focusing signal as generated is then fed to flyback transformer FBT 30.

The voltage level of each of power supply B1 and B2 can be varied as necessary. The voltage level of a power supply B2 however, determines the maximum value of power gain.

Also, a gain control of a parabolic waveform signal output from a collector electrode of transistor Q3 in amplifier 14, is attainable by directly controlling a direct current flow from micro computer 11 to an inverting terminal of oscillator IC2 by way of simple adjustment of the value of resistor R12 connected therebetween. Microcomputer 11 would output a prestored voltage level of direct current which corresponds to a vertical frequency currently being employed, and thereby a constant vertical focus gain without relation to a variance of vertical frequency being attainable. As a result, an ideal dynamic focusing signal is generated by the above embodiment. Therefore, a user can control a vertical focusing signal output from the above configuration by a manipulation of data storage operation for microcomputer 11.

According to a circuitry of one preferred embodiment as discussed above, for instance, microcomputer 11 supplies a voltage level of 10 volts to oscillator IC2 so as to obtain a focus gain of 200 volts when a vertical frequency of 60 hertz is employed.

When a vertical frequency of 75 Hertz is employed in overall circuit, microcomputer 11 outputs a voltage level of 7 volts so as to maintain a focus gain of 200 volts. If a vertical frequency is 120 Hertz, then microcomputer 11 outputs only a voltage level of 2 volts to keep a focus gain substantially at a voltage level of 200 volts. As explained such above, microcomputer 11 supplies a predetermined voltage level corresponding to a vertical frequency currently being employed to vertical focusing circuit as constructed above, thereby maintaining a constant focus gain at an output terminal of the circuit.

Further, a user may change predetermined values stored in microcomputer 11 as necessary. By adjusting the voltage level of direct current from microcomputer 11 to resistor 12, a focusing signal output voltage gain at an output terminal of transistor Q3 varies.

As explained above, without subjecting to the variance of vertical frequency currently being employed, a vertical focusing circuit according to one preferred embodiment of the present invention is able to obtain a vertical focusing gain of a constant value, thereby enabling a multimode monitor to maintain an ideal dynamic focusing control. In addition to the above, according to one preferred embodiment of the present invention, a vertical focusing gain is able to be controlled by a user's direct manipulation.

While there have been illustrated and described what is to be considered the preferred embodiment of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the scope thereof. Therefore, it is understood that the present invention is not limited to the particular embodiments disclosed as the best mode contemplated, for carrying out the present invention, but embodiments falling within the scope of the appended claims.

What is claimed is:

1. A vertical focusing circuit connected to a junction node of a horizontal focusing circuit and a flyback transformer, for generating a vertical focusing signal which signal is mixed with a horizontal focusing signal output from said horizontal focusing circuit to form a dynamic focusing signal for applying to said flyback transformer, said vertical focusing circuit comprising:

a microcomputer for generating a direct current signal exhibiting a predetermined voltage level corresponding to a vertical frequency currently being employed;

a parabolic waveform signal generator for generating a parabolic waveform signal by using said direct current signal supplied from said microcomputer and a period of a vertical blanking signal;

a buffer for minimizing distortion caused by an impedance unbalance of said parabolic waveform signal; and an amplifier for amplifying said parabolic waveform signal from said buffer to generate said vertical focusing signal.

2. The vertical focusing circuit of claim 1, wherein said parabolic waveform signal generator comprises:

a first oscillator having an inverting terminal connected to receive said direct current signal exhibiting said predetermined voltage level via a first resistor, a non-inverting terminal connected to a junction node of second and third resistors connected in series between a power source terminal and a ground terminal, wherein a reference voltage supplied from said power source terminal is voltage-divided by said second and third resistors;

a first capacitor and a first switching element connected in parallel to said inverting terminal and an output terminal of said first oscillator;

a second capacitor and a fourth resistor connected in series to said output terminal of said first oscillator; and a second oscillator having an inverting terminal connected to said fourth resistor, an non-inverting terminal connected to said junction node of said second and third resistors connected in series between said power source terminal and said ground terminal, and an output terminal for producing said parabolic waveform signal; and a third capacitor and a second switching element connected in parallel to said inverting terminal and said output terminal of said second oscillator, wherein said first and second switching elements are commonly supplied with said vertical blanking signal.

3. The vertical focusing circuit of claim 2, wherein said first resistor connected to said output terminal of said microcomputer corresponds to a variable resistor adjustable to assure constant input of said direct current signal exhibiting said predetermined voltage level.

4. The vertical focusing circuit of claim 2, wherein said second capacitor and said fourth resistor are connected in series to said output terminal of said first oscillator to minimize distortion of a voltage level of said parabolic waveform signal.

5. The vertical focusing circuit of claim 1, wherein said buffer comprises:

a first resistor and a capacitor connected in series to receive said parabolic waveform signal;

a transistor having a base electrode terminal connected to said capacitor, an emitter electrode terminal to a ground terminal via a second resistor, and a collector electrode terminal connected to a power source terminal; and a pair of bias resistors for said transistor, connected between said power source terminal and said ground terminal.

6. The vertical focusing circuit of claim 1, wherein said amplifier comprises:

a transistor having a collector electrode terminal connected to a power supply terminal via a first resistor, an emitter electrode terminal connected to a ground terminal via a second resistor, and a base electrode terminal connected to receive an output of said buffer; and a third resistor connected to said collector electrode terminal of said transistor, for providing said vertical focusing signal to said flyback transformer.

7. The vertical focusing circuit of claim 2, wherein said buffer comprises:

a fifth resistor and a third capacitor connected in series to said output terminal of said second oscillator of said parabolic waveform signal generator;

a first transistor having a base electrode terminal connected to said third capacitor, an emitter electrode terminal to said ground terminal via a sixth resistor, and a collector electrode terminal connected to said power source terminal; and a pair of bias resistors for said first transistor, connected between said power source terminal and said ground terminal.

8. The vertical focusing circuit of claim 7, wherein said amplifier comprises:

a second transistor having a collector electrode terminal connected to said power supply terminal via a seventh resistor, an emitter electrode terminal connected to said ground terminal via a eighth resistor, and a base electrode terminal connected to said emitter electrode terminal of said first transistor of said buffer; and a ninth resistor connected to said collector electrode terminal of said second transistor, for providing said vertical focusing signal to said flyback transformer.

9. The vertical focusing circuit of claim 8, wherein said first resistor connected to said output terminal of said microcomputer of said parabolic waveform signal generator corresponds to a variable resistor adjustable to assure constant input of said direct current signal exhibiting said predetermined voltage level.

10. The vertical focusing circuit of claim 9, wherein said second capacitor and said fourth resistor are connected in series to said output terminal of said first oscillator of said parabolic wave signal generator to minimize distortion of a voltage level of said parabolic waveform signal.

11. A vertical focusing circuit, comprising:

means for generating a direct current signal exhibiting a predetermined voltage level corresponding to a vertical frequency;

a parabolic waveform signal generator coupled to receive said direct current signal, for generating a parabolic waveform signal using said direct current signal and a period of a vertical blanking signal;

a buffer coupled to receive said parabolic waveform signal, for minimizing distortion caused by impedance unbalance of said parabolic waveform signal; and an amplifier for amplifying an output of said buffer to generate a vertical focusing signal to be mixed with a horizontal focusing signal for forming an optimal focus control signal to focus control an image in a display device.

12. The vertical focusing circuit of claim 11, wherein said parabolic waveform signal generator comprises:

a first oscillator having a first input terminal connected to receive said direct current signal exhibiting said predetermined voltage level via a first resistor, a second input terminal connected to a junction node of second and third resistors connected in series between a power source terminal and a ground terminal, and an output terminal for providing an oscillation signal;

a first capacitor and a first switching element coupled to receive said vertical blanking signal, and connected in parallel to said first input terminal and an output terminal of said first oscillator;

a second capacitor and a fourth resistor connected in series to said output terminal of said first oscillator; and a second oscillator having a first input terminal connected to said fourth resistor, a second input terminal connected to said junction node of said second and third resistors connected in series between said power source terminal and said ground terminal, and an output terminal for providing said parabolic waveform signal; and a third capacitor and a second switching element coupled to receive said vertical blanking signal, and connected in parallel to said first input terminal and said output terminal of said second oscillator.

13. The vertical focusing circuit of claim 12, wherein said first resistor of said parabolic waveform signal generator corresponds to a variable resistor adjustable to constant input of said direct current signal exhibiting said predetermined voltage level.

14. The vertical focusing circuit of claim 12, wherein said second capacitor and said fourth resistor are connected in series to said output terminal of said first oscillator to minimize distortion of a voltage level of said parabolic waveform signal.

15. The vertical focusing circuit of claim 11, wherein said buffer comprises:

a first resistor and a capacitor connected in series to receive said parabolic waveform signal;

a transistor having a base electrode terminal connected to said capacitor, an emitter electrode terminal to a ground terminal via a second resistor, and a collector electrode terminal connected to a power source terminal; and a pair of bias resistors connected between said power source terminal and said ground terminal.

16. The vertical focusing circuit of claim 11, wherein said amplifier comprises:

a transistor having a collector electrode terminal connected to a power supply terminal via a first resistor, an emitter electrode terminal connected to a ground terminal via a second resistor, and a base electrode terminal connected to receive the output of said buffer; and a third resistor connected to said collector electrode terminal of said transistor, for providing said vertical focusing signal.

17. The vertical focusing circuit of claim 12, wherein said buffer comprises:

a fifth resistor and a third capacitor connected in series to said output terminal of said second oscillator of said parabolic waveform signal generator;

a first transistor having a base electrode terminal connected to said third capacitor, an emitter electrode terminal to said ground terminal via a sixth resistor, and a collector electrode terminal connected to said power source terminal; and a pair of bias resistors connected between said power source terminal and said ground terminal.

18. The vertical focusing circuit of claim 17, wherein said amplifier comprises:

a second transistor having a collector electrode terminal connected to said power supply terminal via a seventh resistor, an emitter electrode terminal connected to said ground terminal via a eighth resistor, and a base electrode terminal connected to said emitter electrode terminal of said first transistor of said buffer; and a ninth resistor connected to said collector electrode terminal of said second transistor, for providing said vertical focusing signal to said flyback transformer.

19. A vertical focusing circuit for a cathode-ray tube, comprising:

a voltage divider connected between a power source terminal and a ground terminal to generate a reference voltage level;

a first oscillator having a first input terminal coupled to receive a direct current signal exhibiting a predetermined voltage level corresponding to a vertical frequency via a first resistor, a second input terminal coupled to receive said reference voltage level, and an output terminal for generating a first oscillation signal;

a first capacitor and a first switching element coupled to receive a vertical blanking signal, and connected in parallel to said first input terminal and said output terminal of said first oscillator;

means for minimizing distortion of a voltage level of said first oscillation signal;

a second oscillator having a first input terminal coupled to receive said first oscillation signal, a second input terminal coupled to receive said reference voltage level, and an output terminal for generating a second oscillation signal indicative of a parabolic waveform signal;

a second capacitor and a second switching element coupled to receive said vertical blanking signal, and connected in parallel to said first input terminal and said output terminal of said second oscillator;

a second resistor and a third capacitor connected in series to said output terminal of said second oscillator;

a first transistor having a base electrode terminal connected to said third capacitor, an emitter electrode terminal to said ground terminal via a third resistor, and a collector electrode terminal connected to said power source terminal;

a pair of bias resistors connected between said power source terminal and said ground terminal;

a second transistor having a collector electrode terminal connected to said power supply terminal via a fourth resistor, an emitter electrode terminal connected to said ground terminal via a fifth resistor, and a base electrode terminal connected to said emitter electrode terminal of said first transistor; and a sixth resistor connected to said collector electrode terminal of said second transistor, for generating a vertical focusing signal to be mixed with a horizontal focusing signal for forming an optimal focus control signal to focus control an image displayed on said cathode-ray tube.

20. The vertical focusing circuit of claim 19, wherein said first corresponds to a variable resistor adjustable to constant input of said direct current signal exhibiting said predetermined voltage level.

* * * * *